United States Patent
Gandhi et al.

(10) Patent No.: US 12,235,459 B1
(45) Date of Patent: Feb. 25, 2025

(54) COLLAPSIBLE HEAD-MOUNTABLE DEVICE

(71) Applicant: Apple Inc., Cupertino, CA (US)

(72) Inventors: Ronit K. Gandhi, Cupertino, CA (US); James W. Vandyke, San Francisco, CA (US); Jonathan C. Atler, Mountain View, CA (US); Yoonhoo Jo, San Francisco, CA (US); Jason C. Sauers, Sunnyvale, CA (US); Claire E. Dalke, Foster City, CA (US); Ivan S. Maric, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 940 days.

(21) Appl. No.: 17/336,167

(22) Filed: Jun. 1, 2021

Related U.S. Application Data (60) Provisional application No. 63/049,555, filed on Jul. 8, 2020.

(51) Int. Cl.
*G02B 27/01* (2006.01)
*G06F 1/16* (2006.01)

(52) U.S. Cl.
CPC ..... *G02B 27/0176* (2013.01); *G02B 27/0172* (2013.01); *G06F 1/1681* (2013.01)

(58) Field of Classification Search
CPC ......... G03H 2001/043; G03H 2240/25; G03H 2270/21; G02B 27/0176; G02B 27/0172; G06F 1/1681
USPC .......................................................... 359/14
See application file for complete search history.

(56) References Cited

U.S. PATENT DOCUMENTS

| | | | |
|---|---|---|---|
| 8,957,835 B2 | 2/2015 | Hoellwarth | |
| 9,081,210 B2 | 7/2015 | Adams | |
| 10,095,275 B2 | 10/2018 | Byun et al. | |
| 2017/0102549 A1* | 4/2017 | Lee | G02B 27/0176 |
| 2020/0409150 A1* | 12/2020 | Lee | G02B 7/02 |
| 2021/0208408 A1* | 7/2021 | Boger | G06F 3/011 |

* cited by examiner

*Primary Examiner* — Henry Duong
(74) *Attorney, Agent, or Firm* — BAKERHOSTETLER (57) ABSTRACT

A head-mountable device can provide adjustable size and shape for storage, transport, and/or charging. A head-mountable device can provide a bistable adjustment mechanism, such as a bistable hinge, that biases a component of the head-mountable device to either of two configurations. Such adjustability can be provided by a light seal module of the head-mountable device and can facilitate collapse of a head securement element, such as arms for engaging the head of the user.

19 Claims, 4 Drawing Sheets

COLLAPSIBLE HEAD-MOUNTABLE DEVICE

CROSS-REFERENCE TO RELATED APPLICATION

This application claims the benefit of U.S. Provisional Application No. 63/049,555, entitled "COLLAPSIBLE HEAD-MOUNTABLE DEVICE," filed Jul. 8, 2020, the entirety of which is incorporated herein by reference.

TECHNICAL FIELD

The present description relates generally to head-mountable devices, and, more particularly, to collapsible configurations for head-mountable devices, such as with bistable adjustment assemblies.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

It can be desirable to provide a head-mountable device with various configurations that can alternately be achieved to enhance both usage and storage of the device. For example, in use the display elements of a head-mountable device can be desirably positioned with respect to the user's eyes while engaging the head and/or face of the user. At other times, it can be desirable to store the head-mountable device in a more compact form to reduce space occupancy and/or to engage with other devices, such as a charging station.

Embodiments of the present disclosure provide a head-mountable device that provides adjustable size and shape for storage, transport, and/or charging. A head-mountable device can provide a bistable adjustment mechanism, such as a bistable hinge, that biases a component of the head-mountable device to either of two configurations. Such adjustability can be provided by a light seal module of the head-mountable device and can facilitate collapse of a head securement element, such as arms for engaging the head of the user.

These and other embodiments are discussed below with reference to FIGS. 1-8. However, those skilled in the art will readily appreciate that the detailed description given herein with respect to these Figures is for explanatory purposes only and should not be construed as limiting.

Figure 1:
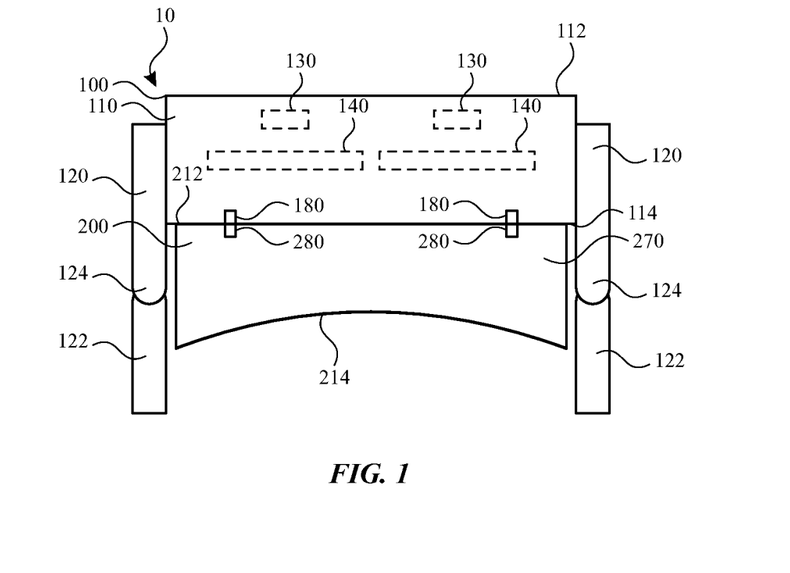
FIG. 1 illustrates a top view of a head-mountable device with a light seal in an expanded configuration and arms in a deployed configuration, according to some embodiments of the present disclosure.

According to some embodiments, for example as shown in FIG. 1, a head-mountable device 10 includes an HMD module 100 and a light seal module 200. The HMD module 100 includes a frame 110 that is worn on a head of a user. The frame 110 can be positioned in front of the eyes of a user to provide information within a field of view of the user. The HMD module 100 and/or the light seal module 200 can provide a nosepiece to rest on a user's nose.

The frame 110 can provide structure around a peripheral region thereof to support any internal components of the HMD module 100 in their assembled position. For example, the frame 110 can enclose and support various internal components (including for example integrated circuit chips, processors, memory devices and other circuitry) to provide computing and functional operations for the head-mountable device 10, as discussed further herein. While several components are shown within the frame 110, it will be understood that some or all of these components can be located anywhere within or on the head-mountable device 10. For example, one or more of these components can be positioned within the light seal module 200 and/or a head securement element of the head-mountable device 10.

The frame 110 can include and/or support one or more camera modules 130. The camera modules 130 can be positioned on or near an outer side 112 of the frame 110 to capture images of views external to the head-mountable device 10. As used herein, an outer side of a portion of a head-mountable device is a side that faces away from the user and/or towards an external environment. The captured images can be used for display to the user or stored for any other purpose. Each of the camera modules 130 can be movable along the outer side 112. For example, a track or other guide can be provided for facilitating movement of the camera module 130 therein.

The head-mountable device 10 can include display elements 140 that provide visual output for viewing by a user wearing the head-mountable device 10. One or more display elements 140 can be positioned on or near an inner side 114 of the frame 110. As used herein, an inner side 114 of a portion of a head-mountable device is a side that faces toward the user and/or away from the external environment.

A display element 140 can transmit light from a physical environment (e.g., as captured by a camera module) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set based on an interpupillary distance ("IPD") of the user. IPD is defined as the distance between the centers of the pupils of a user's eyes.

The pair of display elements 140 can be mounted to the frame 110 and separated by a distance. The distance between the pair of display elements 140 can be designed to correspond to the IPD of a user. The distance can be adjustable to account for different IPDs of different users that may wear the head-mountable device 10. For example, either or both of the display elements 140 may be movably mounted to the frame 110 to permit the display elements 140 to move or translate laterally to make the distance larger or smaller. Any type of manual or automatic mechanism may be used to permit the distance between the display elements 140 to be an adjustable distance. For example, the display elements 140 can be mounted to the frame 110 via slidable tracks or guides that permit manual or electronically actuated movement of one or more of the display elements 140 to adjust the distance there between.

Additionally or alternatively, the display elements 140 can be moved to a target location based on a desired visual effect that corresponds to user's perception of the display element 140 when it is positioned at the target location. The target location can be determined based on a focal length of the user and/or optical elements of the system. For example, the user's eye and/or optical elements of the system can determine how the visual output of the display element 140 will be perceived by the user. The distance between the display element 140 and the user's eye and/or the distance between the display element 140 and one or more optical elements can be altered to place the display element 140 at, within, or outside of a corresponding focal distance. Such adjustments can be useful to accommodate a particular user's eye, corrective lenses, and/or a desired optical effect.

As further shown in FIG. 1, the light seal module 200 can include a chassis that provides structural support to one or more other components of the light seal module 200. The chassis 210, or portions thereof, can extend to, from, and/or between the inner side 214 and the outer side 212. The chassis 210 can support a cover 270 that extends at least partially from the outer side 212 to the inner side 214. The chassis and/or the cover 270 can define an interior space through which light can pass, thereby providing to the user wearing the head-mountable device a view of a display element of the HMD module 100. Such a view can be enhanced by preventing the ingress of light from the external environment and into the light seal module 200.

As further shown in FIG. 1, attachment elements can facilitate coupling of the HMD module 100 to the light seal module 200 in a relative position and orientation that aligns the display elements 140 of the HMD module 100 in a preferred position and orientation for viewing by the user. The HMD module 100 and the light seal module 200 can be coupled to prevent ingress of light from an external environment. For example, HMD module attachment elements 180 can releasably engage light seal module attachment elements 280. One or more of various mechanisms can be provided to secure the modules to each other. For example, mechanisms such as locks, latches, snaps, screws, clasps, threads, magnets, pins, an interference (e.g., friction) fit, knurl presses, bayoneting, and/or combinations thereof can be included to couple and/or secure the HMD module 100 and the light seal module 200 together. The modules can remain secured to each other until an optional release mechanism is actuated. The release mechanism can be provided on an outer surface of the head-mountable device 10 for access by a user.

While the light seal module 200 is shown schematically with a particular size and shape, it will be understood that the size and shape of the light seal module 200, particularly at the inner side 214 of the light seal module 200, can have a size and shape that accommodates the face of a user wearing the head-mountable device 10. For example, the inner side 214 can provide a shape that generally matches the contours of the user's face around the eyes of the user. The inner side 214 can be provided with one or more features that allow the light seal module 200 to conform to the face of the user to enhance comfort and block light from entering the light seal module 200 at the point of contact with the face. For example, the inner side 214 can provide a flexible, soft, elastic, and/or compliant structure.

The HMD module 100 and/or the light seal module 200 can be supported on a user's head with a head securement element, such as arms 122. The arms 122 can wrap or extend along opposing sides of a user's head and/or to a rear of the user's head. The arms 122 can optionally include earpieces for wrapping around or otherwise engaging or resting on a user's ears. It will be appreciated that other configurations can be applied for securing the head-mountable device 10 to a user's head. For example, one or more bands, straps, belts, caps, hats, or other components can be used in addition to or in place of the illustrated arms 122 of the head-mountable device 10. The head securement element can optionally include a band (not shown) for extending to and/or about a rear side of the head of the user. The band can optionally extend from ends of the arms 122. The band can be stretchable to comfortably provide tension about the head of the user. The head securement element can further include an adjustment element (not shown) for adjusting a tightness and/or fit of the head securement element, including the arms 122 and/or a band attached thereto.

As shown in FIG. 1, the head securement element can include arms 122 on opposing sides of the head-mountable device 10. Each of the arms 122 can be pivotably coupled to the frame 110. For example, the HMD module 100 can include extensions 120 that extend from and/or are integrally formed with the frame 110. The extensions 120 and the frame 110 can form a continuous, rigid structure. It will be understood that the extensions 120 can optimally be a portion of the frame 110 or another component of the HMD module 100. The arms 122 and/or the extensions 120 can include an electronic component that is provided at a location that is preferred for certain components, such as speakers to direct sound to the ears of the user.

The arms 122 can be coupled to the HMD module 100 by hinges 124. The hinges 124 can allow the arms 122 to pivot relative to the HMD module 100, for example by moving towards or away from each other. By further example, the hinges 124 can provide rotation about axes that are parallel to each other and/or that extend substantially vertically along sides of the head-mountable device 10.

As shown in FIG. 1, the light seal module 200 may have a thickness in an expanded configuration that places the display elements 140 at a desired distance from the eyes of the user when the head-mountable device 10 is worn. However, the light seal module 200, while in the expanded configuration, may obstruct the pivoting movement of the arms 122. It can be desirable to provide a collapsed configuration so that the head-mountable device 10 can be stored, transported, charged, or otherwise maintained in a compact size and shape.

Figure 2:
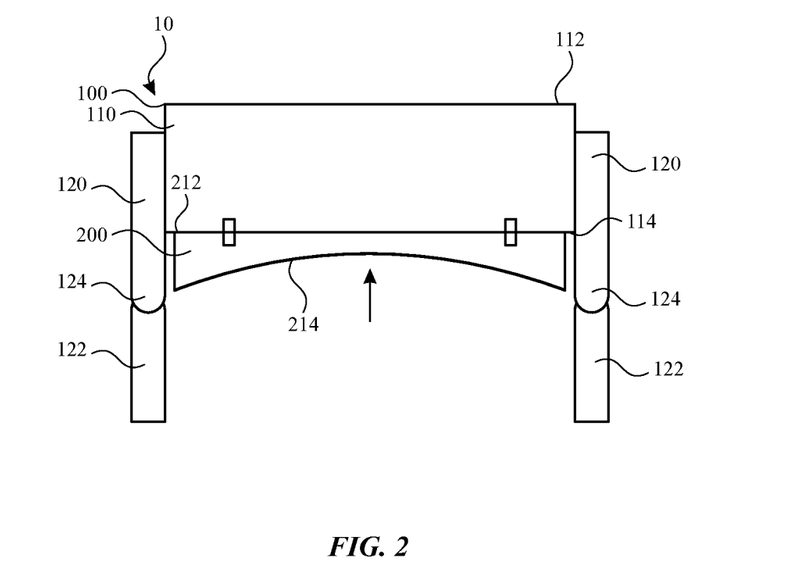
FIG. 2 illustrates a top view of a head-mountable device with a light seal in a collapsed configuration and arms in a deployed configuration, according to some embodiments of the present disclosure.

Referring now to FIG. 2, a light seal module of a head-mountable device can transition to a collapsed configuration. FIG. 2 illustrates a top view of a head-mountable device with a light seal in a collapsed configuration and arms in a deployed configuration, according to some embodiments of the present disclosure.

As shown in FIG. 2, the light seal module 200 can transition from an expanded configuration (FIG. 1) to a collapsed configuration (FIG. 2). While in the collapsed configuration, the light seal module 200 can have a second thickness that is less than the first thickness while in the expanded configuration (FIG. 1), as described further herein.

Figure 3:
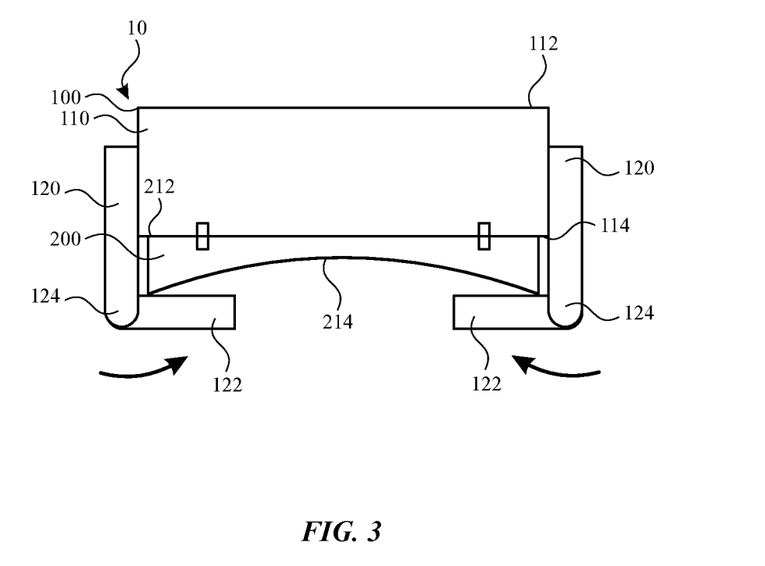
FIG. 3 illustrates a top view of a head-mountable device with a light seal in a collapsed configuration and arms in a stowed configuration, according to some embodiments of the present disclosure.

Referring now to FIG. 3, a light seal module in a collapsed configuration can allow and/or result from movement of arms on opposing sides thereof. FIG. 3 illustrates a top view of a head-mountable device with a light seal in a collapsed configuration and arms in a stowed configuration, according to some embodiments of the present disclosure.

As shown in FIG. 3, the arms 122 can transition from a deployed configuration (FIGS. 1 and 2) to a stowed configuration (FIG. 3). The light seal module 200, being in the collapsed configuration, can allow such movement of the arms 122. For example, the thickness of the light seal module 200 while in the collapsed configuration can avoid obstructing the arms 122 and/or the hinges 124. As such, the arms 122 can be stowed to provide an overall smaller size and shape for the head-mountable device 10.

Additionally or alternatively, the movement of the arms 122 as they pivot about the hinge 124 can facilitate transition of the light seal module 200 from the expanded configuration to the collapsed configuration. For example, the arms 122 can start from a deployed configuration and the light seal 200 can start from an expanded configuration. Subsequently, the arms 122 can be pivoted about the hinges 124. As the arms 122 pivot, the arms 122 can apply forces to the light seal module 200 so that it transitions from the expanded configuration to the collapsed configuration. Such a transition can be made by applying forces directly to an exterior of the lights or module 200. Additionally or alternatively, such a transition can be made by applying forces to a mechanism of the light seal module 200 that manages its configuration, as described further herein. As such, transitions of the light seal module 200 and the arms 122 can be simultaneous or sequential.

Figure 4:
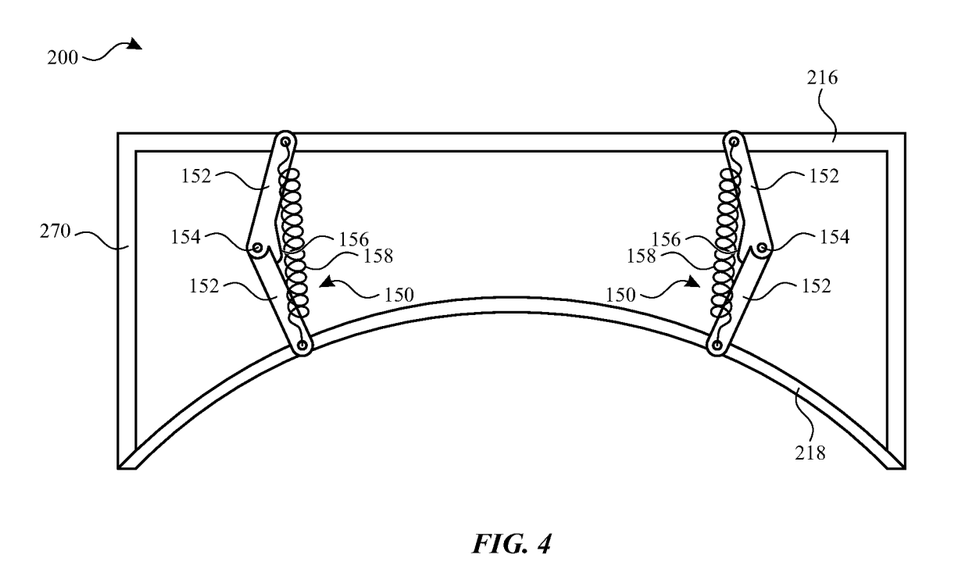
FIG. 4 illustrates a top view of a light seal module in an expanded configuration, according to some embodiments of the present disclosure.
Figure 5:
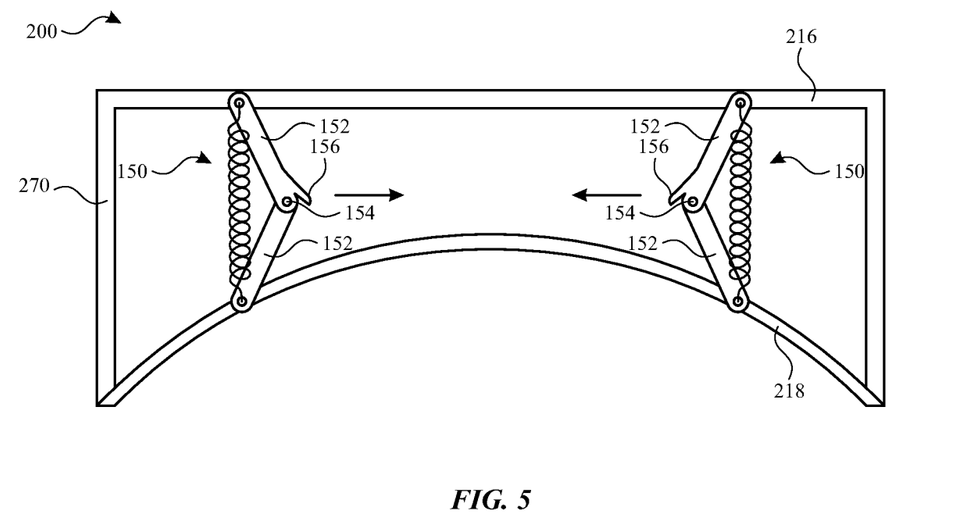
FIG. 5 illustrates a top view of a light seal module in an intermediate configuration, according to some embodiments of the present disclosure.
Figure 6:
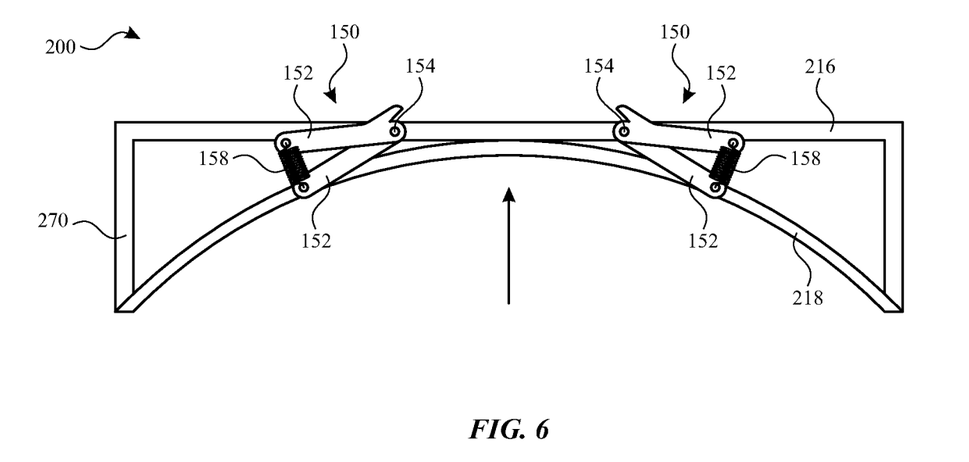
FIG. 6 illustrates a top view of a light seal module in a collapsed configuration, according to some embodiments of the present disclosure.

Referring now to FIGS. 4-6, a light seal module can be provided with a mechanism that manages transitions thereof. It will be understood that the light seal module 200 of FIGS. 4-6 can be a light seal module 200 of FIGS. 1-3 and/or another part of a head-mountable device.

FIG. 4 illustrates a top view of a light seal module in an expanded configuration, according to some embodiments of the present disclosure. As shown in FIG. 4, the light seal module 200 can include a bistable hinge assembly 150. As used herein, a bistable hinge is a component that facilitates a stable maintenance in one of two configurations. For example, a bistable hinge, such as that of the bistable hinge assembly 150, can stably maintain a light seal module 200 in an expanded configuration until a sufficient external force is applied. By further example, a bistable hinge, such as that of the bistable hinge assembly 150, can stably maintain a light seal module 200 in a collapsed configuration until a sufficient external force is applied. Between the expanded configuration and the collapsed configuration, the bistable hinge assembly 150 can provides an unstable equilibrium that allows the light seal module 200 to prefer either one of the expanded configuration and the collapsed configuration.

As further shown in FIG. 4, the light seal module 200 can include a chassis formed from an outer chassis portion 216 and an inner chassis portion 218. The cover 270 can extend between, across, and/or over the outer chassis portion 216 and the inner chassis portion 218. The distance between and/or spanned by the outer chassis portion 216 and the inner chassis portion 218 can define the thickness of the light seal module 200.

The bistable hinge assembly 150 can include hinge segments 152 pivotably coupled to each other at first ends thereof. For example the hinge segments 152 can pivot relative to each other and about a hinge 154.

Each of the hinge segments 152 can be pivotably coupled to either the outer chassis portion 216 or the inner chassis portion 218 at second ends thereof. For example, one of the hinge segments 152 can be pivotably coupled to the outer chassis portion 216 and the other of the hinge segments 152 can be pivotably coupled to the inner chassis portion 218.

The bistable hinge assembly 150 can include a spring 158 biasing the second ends of the hinge segments 152 towards each other. Such biasing can provide stability in each of the expanded configuration and the collapsed configuration. For example, the hinge 154 can move to be on either side of the spring 158, as discussed further herein. In either configuration, the spring 158 can pull the ends of the hinge segments 152 toward each other. Accordingly, the spring 158 can further pull the outer chassis portion 216 and the inner chassis portion 218 toward each other.

As further shown in FIG. 4, the bistable hinge assembly 150 can include one or more stoppers 156 to limit the extent of pivot about the hinge 154. For example, the spring 158 can pull the ends until the stopper 156 of one hinge segment 152 contacts the other hinge segment 152. At such a configuration, the movement is limited, and the ongoing bias of the spring 158 maintains the light seal module 200 in the expanded configuration.

FIG. 5 illustrates a top view of a light seal module in an intermediate configuration, according to some embodiments of the present disclosure. In the intermediate configuration, the hinge 154 is moved to overlap the spring 158 and/or be on a side of the spring 158 other than when in the expanded configuration (FIG. 4). For purposes of illustration, the intermediate configuration of FIG. 5 may represent one of many configurations between the expanded configuration and the collapsed configuration. In at least one intermediate configuration, the bistable hinge assembly 150 can provide an unstable equilibrium, in which the hinge segments 150 are balanced yet prefer to move to either the expanded configuration and the collapsed configuration. As such, the bistable hinge assembly 150 can require an external force to move from either the expanded configuration to the intermediate configuration or from the collapsed configuration to the intermediate configuration. When moving beyond the intermediate configuration, the bistable hinge assembly 150 can urge the light seal module 200 to the nearest one of the expanded configuration and the collapsed configuration.

FIG. 6 illustrates a top view of a light seal module in a collapsed configuration, according to some embodiments of the present disclosure. As shown in FIG. 6, the light seal module 200 can have a reduced thickness in the collapsed configuration. The spring 158 can bias the light seal module 200 to such a configuration and further stably maintain the collapsed configuration. The limit of such biasing can be provided by the bistable hinge assembly 150 itself and/or an engagement between the outer chassis portion 216 and the inner chassis portion 218.

It will be understood that the cover 270 can move to accommodate the variable thickness of the light seal module 200. For example, the cover 270 can be flexible, bendable, collapsible, foldable, or otherwise adjustable. Additionally or alternatively, one or more guides, grooves, channels, pistons, and/or chambers can be provided to facilitate movement of the outer chassis portion 216 relative to the inner chassis portion 218.

Figure 7:
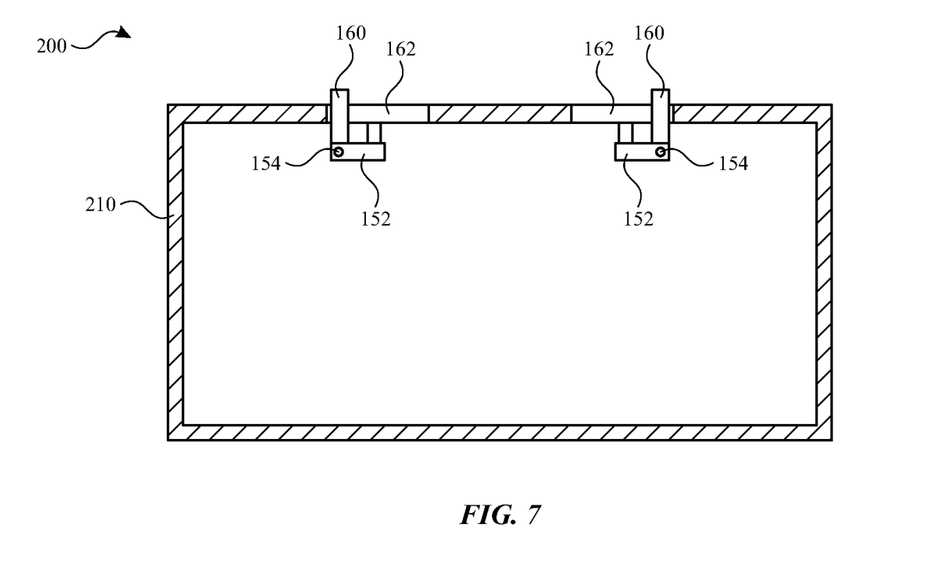
FIG. 7 illustrates a rear view of a light seal module, according to some embodiments of the present disclosure.

Referring now to FIG. 7, the user can be provided with access to adjust the thickness of a light seal module. FIG. 7 illustrates a rear view of a light seal module, according to some embodiments of the present disclosure. As shown in FIG. 7, the light seal module 200 can include a lever 160 extending from the hinge 154 and through the cover 270. The can be accessible by a user to apply a force to the bistable hinge assembly. For example, the lever 160 can be moveable to adjust a position of the hinge 154 with respect to the first ends of the hinge segments 152 and/or the spring. The lever 160 can be moved within an opening 162 through the cover 270.

While two levers are shown, with one for each of a pair of hinge assemblies, it will be understood that any number of levers can be provided. For example, a single lever can be coupled to each of multiple hinge assemblies, such that a user can operate a single lever to simultaneously actuate multiple hinge assemblies. By further example, other actuation mechanisms can be provided, such as actuation via the arms of the head-mountable device. As described herein, as the arms are moved from a deployed configuration to a stowed configuration, the arms can act on the levers or another component to act on hinge assemblies, thereby actuating the hinge assemblies and transitioning the light seal module from one configuration to another.

While the adjustments and configurations described herein are illustrated as applying to an entire light seal module, it will be understood that such adjustments can apply to one or more (e.g., all) of multiple segments of a light seal module. For example, a light seal module can be divided into separate sections (e.g., hemispheres, quadrants, etc.), wherein each of the sections can be independently adjusted to transition between different configurations, such as with mechanisms described herein. Any number of sections can be provided.

The adjustments and configurations described herein can be utilized to offer different configurations for different users. For example, the light seal module can be adjustable to accommodate features of different users, thereby providing a preferred and customizable fit. Accordingly, the same head-mountable device can be used by various users in the corresponding configuration for each user.

Operation of thickness adjustment can be manually performed and/or automated, such as by a motor or actuator operatively connected to the light seal module 200. For example, the levers 160 can be operated based on input from a user, a sensor, and/or another device.

Figure 8:
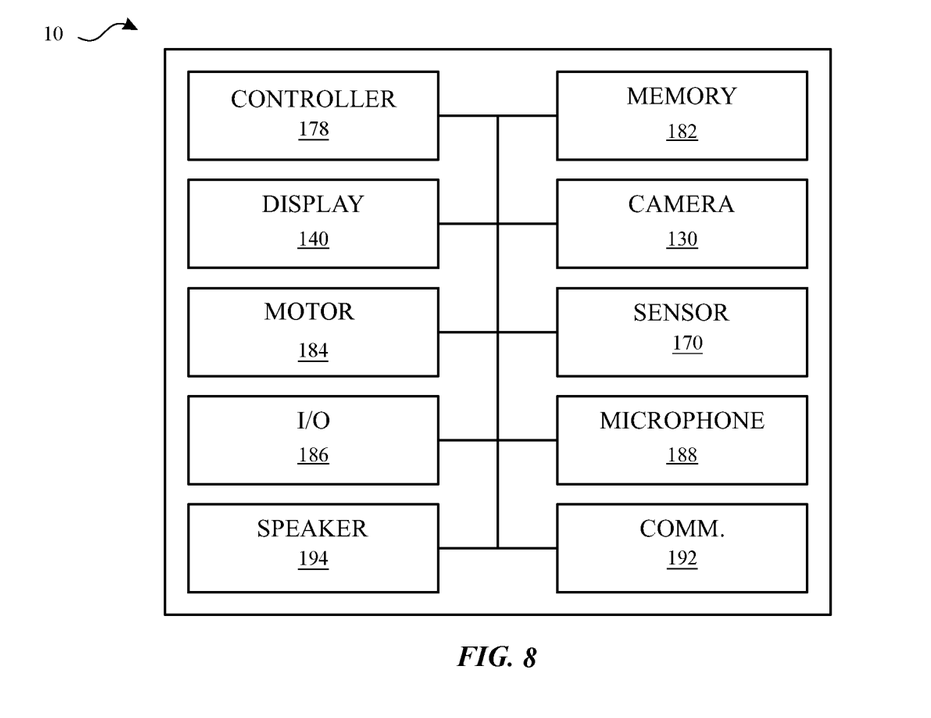
FIG. 8 illustrates a block diagram of a head-mountable device, in accordance with some embodiments of the present disclosure.

Referring now to FIG. 8, components of the head-mountable device can be operably connected to provide the performance described herein. FIG. 8 shows a simplified block diagram of an illustrative head-mountable device 10 in accordance with one embodiment of the invention. It will be appreciated that components described herein can be provided on one, some, or all of an HMD module, a light seal module, a nosepiece, and/or a securement element. It will be understood that additional components, different components, or fewer components than those illustrated may be utilized within the scope of the subject disclosure.

As shown in FIG. 8, the head-mountable device 10 can include a controller 178 (e.g., control circuitry) with one or more processing units that include or are configured to access a memory 182 having instructions stored thereon. The instructions or computer programs may be configured to perform one or more of the operations or functions described with respect to the head-mountable device 10. The controller 178 can be implemented as any electronic device capable of processing, receiving, or transmitting data or instructions. For example, the controller 178 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 10. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 10 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 10 can include an optical subassembly configured to help optically adjust and correctly project the image-based content being displayed by the display element 140 for close up viewing. The optical subassembly can include one or more lenses, mirrors, or other optical devices.

The head-mountable device 10 can include adjustment control components described herein, such as a motor 184, an actuator, and the like for moving components to a desired relative position and/or orientation.

The head-mountable device 10 can include one or more sensors 170, as described herein. The head-mountable device 10 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 10 can include an input/output component 186, which can include any suitable component for connecting head-mountable device 10 to other devices. Suitable components can include, for example, audio/video jacks, data connectors, or any additional or alternative input/output components. The input/output component 186 can include buttons, keys, or another feature that can act as a keyboard for operation by the user.

The head-mountable device 10 can include the microphone 188 as described herein. The microphone 188 can be operably connected to the controller 178 for detection of sound levels and communication of detections for further processing, as described further herein.

The head-mountable device 10 can include one or more speakers 194. The speakers 194 can be operably connected to the controller 178 for control of audio output, including sound levels, as described further herein.

The head-mountable device 10 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHZ, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 10 can include a battery, which can charge and/or power components of the head-mountable device 10. The battery can also charge and/or power components connected to the head-mountable device 10.

Accordingly, embodiments of the present disclosure provide a head-mountable device that provides adjustable size and shape for storage, transport, and/or charging. A head-mountable device can provide a bistable adjustment mechanism, such as a bistable hinge, that biases a component of the head-mountable device to either of two configurations. Such adjustability can be provided by a light seal module of the head-mountable device and can facilitate collapse of a head securement element, such as arms for engaging the head of the user.

Various examples of aspects of the disclosure are described below as clauses for convenience. These are provided as examples, and do not limit the subject technology.

Clause A: a head-mountable device comprising: a frame; a display element supported by the frame; and a light seal module comprising: an outer chassis portion; an inner chassis portion; hinge segments pivotably coupled to each other at first ends and pivotably coupled to either the outer chassis portion or the inner chassis portion at second ends; and a spring biasing the second ends of the hinge segments towards each other.

Clause B: a head-mountable device comprising: a frame; a display element supported by the frame; and a light seal module comprising a bistable hinge assembly, the light seal module being configured to transition between: an expanded configuration in which the bistable hinge assembly biases the light seal module to a first thickness; a collapsed configuration in which the bistable hinge assembly biases the light seal module to a second thickness, less than the first thickness; and an intermediate configuration in which the bistable hinge assembly provides an unstable equilibrium between the expanded configuration and the collapsed configuration.

Clause C: a head-mountable device comprising: a frame; a display element supported by the frame; a light seal module; a pair of arms, each of the arms being rigid and pivotably coupled to the frame, the arms being configured to transition between: a deployed configuration in which the light seal module is allowed to expand to a first thickness; and a stowed configuration in which the arms urge the light seal module to a second thickness, less than the first thickness.

One or more of the above clauses can include one or more of the features described below. It is noted that any of the following clauses may be combined in any combination with each other, and placed into a respective independent clause, e.g., clause A, B, or C.

Clause 1: the frame and the display element are components of an HMD module, the HMD module further comprising an HMD module attachment element on an inner side of the frame; and the light seal module further comprises: a cover extending about the chassis; and a light seal module attachment element on an outer side of the chassis, the light seal module attachment element being configured to engage the HMD module attachment element.

Clause 2: a pair of arms, each of the arms being rigid and pivotably coupled to the frame.

Clause 3: the first ends of the hinge segments are coupled together by a hinge.

Clause 4: the light seal module further comprises a cover extending across the outer chassis portion and the inner chassis portion and surrounding at least a portion of the hinge segments, the hinge, and the spring; and the head-mountable device further comprises a lever extending from the hinge and through the cover, the lever being moveable to adjust a position of the hinge with respect to the first ends of the hinge segments.

Clause 5: the spring extends from each of the first ends of the hinge segments, wherein the hinge is moveable from a first side of the spring to a second side of the spring.

Clause 6: a stopper configured to limit movement of the first ends of the hinge segments towards each other while the hinge is on the first side of the spring.

Clause 7: the outer chassis portion, the inner chassis portion, the hinge segments, and the spring are components of a first bistable hinge assembly; and the head-mountable device further comprises a second bistable hinge assembly coupling the inner chassis portion to the outer chassis portion.

Clause 8: the frame and the display element are components of an HMD module, the HMD module further comprising an HMD module attachment element on an inner side of the frame; and the light seal module further comprises: a chassis having an outer side and an inner side; a cover extending about the chassis; and a light seal module attachment element on the outer side of the chassis, the light seal module attachment element being configured to engage the HMD module attachment element.

Clause 9: the chassis comprises an outer chassis portion and an inner chassis portion; and the first thickness and the second thickness are defined as distances between the outer chassis portion and an inner chassis portion.

Clause 10: a pair of arms, each of the arms being rigid and pivotably coupled to the frame.

Clause 11: the arms are configured to transition between a deployed configuration and a stowed configuration.

Clause 12: while the light seal module is in the expanded configuration, the arms are obstructed from transitioning from the deployed configuration to the stowed configuration; and while the light seal module is in the collapsed configuration, the arms are allowed to transition from the deployed configuration to the stowed configuration.

Clause 13: the arms are pivotably coupled to the frame by hinges on opposite sides of the light seal module.

Clause 14: the hinges are bistable hinges.

Clause 15: the arms are biased to the stowed configuration and the light seal module is biased to expand to the first thickness.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
    a frame;
    a display element supported by the frame; and
    a light seal module comprising:
        an outer chassis portion;
        an inner chassis portion;
        hinge segments pivotably coupled to each other at first ends and pivotably coupled to either the outer chassis portion or the inner chassis portion at second ends, wherein the first ends of the hinge segments are coupled together by a hinge;
        a spring biasing the second ends of the hinge segments towards each other;
        a cover extending between the outer chassis portion and the inner chassis portion; and
        a lever extending from the hinge and through the cover, the lever being moveable to adjust a position of the hinge with respect to the first ends of the hinge segments.

2. The head-mountable device of claim 1, wherein:
    the frame and the display element are components of an HMD module, the HMD module further comprising an HMD module attachment element on an inner side of the frame; and
    the light seal module further comprises:
        the cover extending about the inner chassis portion and the outer chassis portion; and
        a light seal module attachment element on an outer side of the outer chassis portion, the light seal module attachment element being configured to engage the HMD module attachment element.

3. The head-mountable device of claim 1, further comprising a pair of arms, each of the arms being rigid and pivotably coupled to the frame.

4. The head-mountable device of claim 1, wherein the first ends of the hinge segments are coupled together by a hinge.

5. The head-mountable device of claim 4, wherein
    the cover extends across the outer chassis portion and the inner chassis portion and surrounding at least a portion of the hinge segments, the hinge, and the spring.

6. The head-mountable device of claim 4, wherein the spring extends from each of the first ends of the hinge segments, wherein the hinge is moveable from a first side of the spring to a second side of the spring.

7. The head-mountable device of claim 6, further comprising a stopper configured to limit movement of the first ends of the hinge segments towards each other while the hinge is on the first side of the spring.

8. The head-mountable device of claim 1, wherein;
    the outer chassis portion, the inner chassis portion, the hinge segments, and the spring are components of a first bistable hinge assembly; and
    the head-mountable device further comprises a second bistable hinge assembly coupling the inner chassis portion to the outer chassis portion.

9. A head-mountable device comprising:
    a frame;
    a display element supported by the frame; and
    a light seal module comprising a bistable hinge assembly comprising:
        segments pivotably coupled to each other with a hinge; and
        a spring,
    the light seal module being configured to transition between:
        an expanded configuration in which the spring biases the light seal module to a first thickness while the hinge is on a first side of the segments;
        a collapsed configuration in which the spring biases the light seal module to a second thickness, less than the first thickness, while the hinge is on a second side, opposite the first side, of the segments; and
        an intermediate configuration in which the spring provides an unstable equilibrium between the expanded configuration and the collapsed configuration.

10. The head-mountable device of claim 9, wherein:
    the frame and the display element are components of an HMD module, the HMD module further comprising an HMD module attachment element on an inner side of the frame; and
    the light seal module further comprises:
        a chassis having an outer side and an inner side;
        a cover extending about the chassis; and
        a light seal module attachment element on the outer side of the chassis, the light seal module attachment element being configured to engage the HMD module attachment element.

11. The head-mountable device of claim 10, wherein:
    the chassis comprises an outer chassis portion and an inner chassis portion; and
    the first thickness and the second thickness are defined as distances between the outer chassis portion and the inner chassis portion.

12. The head-mountable device of claim 9, further comprising a pair of arms, each of the arms being rigid and pivotably coupled to the frame.

13. The head-mountable device of claim 12, wherein the arms are configured to transition between a deployed configuration and a stowed configuration.

14. The head-mountable device of claim 13, wherein:
while the light seal module is in the expanded configuration, the arms are obstructed from transitioning from the deployed configuration to the stowed configuration; and
while the light seal module is in the collapsed configuration, the arms are allowed to transition from the deployed configuration to the stowed configuration.

15. A head-mountable device comprising:
a frame;
a display element supported by the frame; and
a light seal module comprising:
  an outer chassis portion;
  an inner chassis portion;
  hinge segments pivotably coupled to each other at first ends and pivotably coupled to either the outer chassis portion or the inner chassis portion at second ends, wherein the first ends of the hinge segments are coupled together by a hinge; and
  a spring coupled to each of the hinge segments on opposing sides of the hinge, the spring biasing the second ends of the hinge segments towards each other.

16. The head-mountable device of claim 15, wherein:
the frame and the display element are components of an HMD module, the HMD module further comprising an HMD module attachment element on an inner side of the frame; and
the light seal module further comprises:
  a cover extending about the inner chassis portion and the outer chassis portion; and
  a light seal module attachment element on an outer side of the outer chassis portion, the light seal module attachment element being configured to engage the HMD module attachment element.

17. The head-mountable device of claim 15, wherein:
the light seal module further comprises a cover extending across the outer chassis portion and the inner chassis portion and surrounding at least a portion of the hinge segments, the hinge, and the spring; and
the head-mountable device further comprises a lever extending from the hinge and through the cover, the lever being moveable to adjust a position of the hinge with respect to the first ends of the hinge segments.

18. The head-mountable device of claim 15, wherein the spring extends from each of the first ends of the hinge segments, wherein the hinge is moveable from a first side of the spring to a second side of the spring.

19. The head-mountable device of claim 18, further comprising a stopper extending from one of the hinge segments, the stopper being configured to limit movement of the first ends of the hinge segments towards each other while the hinge is on the first side of the spring.

* * * * *